L. H. GOODWIN.
VEHICLE BRAKE.
APPLICATION FILED DEC. 2, 1909.
995,344.
Patented June 13, 1911.
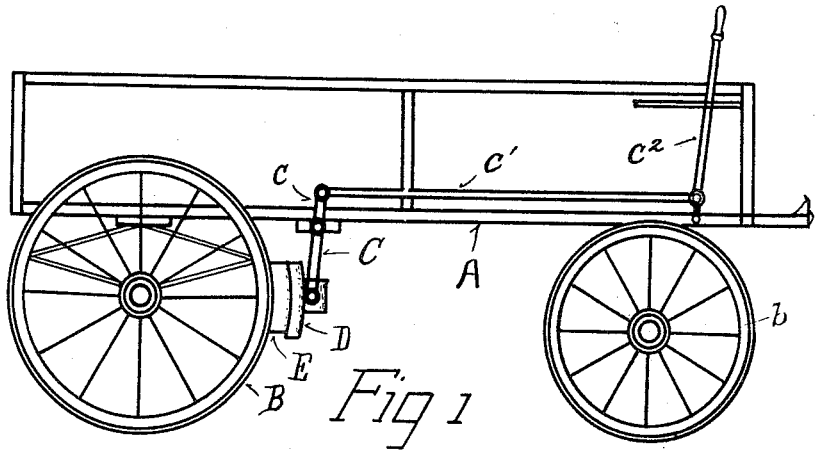
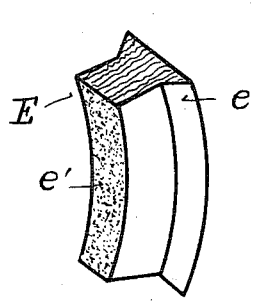
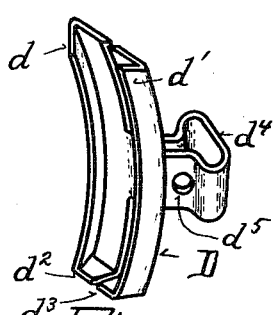
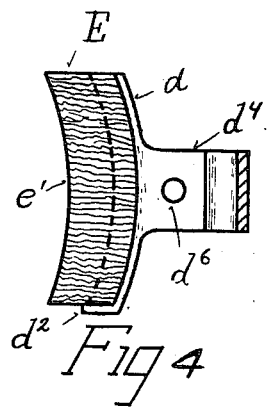
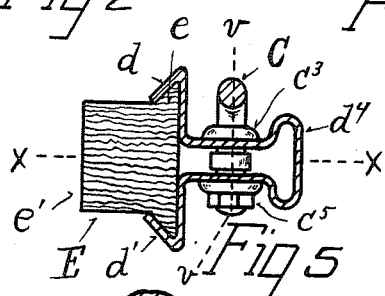
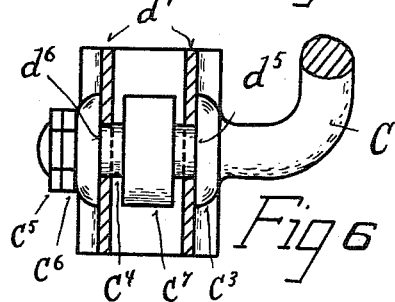
Witnesses
Inventor
Levi H. Goodwin
By C. W. Miles.
Attorney

UNITED STATES PATENT OFFICE.

LEVI H. GOODWIN, OF CINCINNATI, OHIO.

VEHICLE-BRAKE.

995,344.  Specification of Letters Patent.  Patented June 13, 1911.

Application filed December 2, 1909. Serial No. 531,019.

*To all whom it may concern:*

Be it known that I, LEVI H. GOODWIN, a citizen of the United States, residing at Cincinnati, in the county of Hamilton and State of Ohio, have invented certain new and useful Improvements in Vehicle-Brakes, of which the following is a specification.

My invention relates to improvements in vehicle brakes. One of its objects is to provide means whereby a wooden brake block having the end grain of the wood to the wheel may be practically employed.

Another object is to provide a brake of strong and simple construction in which the brake will accommodate or seat itself to the wheel regardless of the load on the wagon.

Another object is to provide for the ready adjustment or tension of the brake, and to provide for convenient renewal of the brake blocks when required.

It further consists in certain details of form, combination and arrangement, all of which will be more fully set forth in the description of the accompanying drawings in which:

Figure 1 is a side elevation of a wagon with my improved brake applied. Fig. 2 is a perspective view of one of the brake blocks detached. Fig. 3 is a perspective view of one of the brake shoes detached. Fig. 4 is a section through the brake shoe and block on line $x$—$x$ of Fig. 5. Fig. 5 is a top plan view of the shoe and block. Fig. 6 is an enlarged section on line $v$ $v$ of Fig. 5. Figs. 7 and 8 are perspective views representing modifications of the ends of the brake lever to which the brake shoe is adapted to be attached.

In the accompanying drawings A represents the wagon body, B, the rear wheel, $b$, the forward wheel, C the brake lever pivotally attached to the wagon body, and actuated in the usual manner by means of a crank arm $c$ attached to the brake lever and connected by a link $c'$ to a hand lever $c^2$. The opposite ends of the brake lever are bent downwardly and the brake shoes attached to said ends in position to be moved into and out of contact with the rear wheels. Other styles of brake lever and operating mechanism from that shown may be employed as my invention relates to the brake shoe and block.

D represents the brake shoe, which may be of cast or stamped metal, and consists of two clamping members $d$ $d'$ adapted to grasp opposite sides of the brake block, and having at the lower end supporting lugs or projections $d^2$ $d^3$ to support the lower end of the brake block and prevent its being pressed or forced endwise from between the members $d$ $d'$. The members $d$ $d'$ also serve to support the rear face of the block. The members $d$ $d'$ are connected together by a loop-shaped body section $d^4$ having perforations $d^5$ $d^6$ through opposite sides for attachment of the brake shoe to the brake lever.

As illustrated in Figs. 5 and 6 the brake lever has a collar $c^3$ seating against one face of the section $d^4$, a shank $c^4$ passing through the perforations $d^5$ $d^6$ and threaded to receive lock nuts $c^5$ $c^6$, which permit the opposite sides of section $d^4$ to be drawn together to the desired extent first to clamp the block firmly to the brake shoe, and second to tension the pivotal movement of the shoe relative to the brake lever so that the shoe will automatically adjust itself to the wheel, and when released from the wheel will not work or be jarred out of position relative to the brake lever so as to be out of operative relation to the wheel. This tension may be increased from time to time if required by tightening up the nuts $c^5$ $c^6$. I preferably provide a washer or collar $c^7$ between the sides of section $d^4$ to prevent tightening the nuts to the extent of breaking or bending the shoe. The members $d$ $d'$ are dovetailed in cross section to more readily grasp and hold the block, and are preferably slightly nearer each other at opposite ends so that the block is engaged first at its ends, and as the tension increases finally at the center, which insures a firm grip on all parts of the block.

The block E is of dove tailed cross section at the rear $e$ to register with the members $d$ $d'$, and at the forward edge projects forward of said members $d$ $d'$ a sufficient distance to provide a wearing surface $e'$, and is preferably cut so as to present the end grain of the wood to the wheel, such an arrangement being permitted without danger of splitting the block or losing parts thereof by reason of the same being clamped in the shoe. The block is preferably curved at the rear face as well as at the front, as this form tends to prevent splitting of the block or detachment of parts thereof. The members $d$ $d'$ are preferably curved on their inner face to register with the curve at the rear face of the block. If desired the rear face of the block may be made straight and the inner faces of members $d$ $d'$ straight to register therewith.

The shoe may be variously attached to the brake lever. In Fig. 8 I have illustrated the end of the brake lever provided with an eye $c^8$ which is adapted to be interposed between the two sections of members $d^4$, and locked in place by a bolt and nuts locking the opposite sides of section $d^4$ to the eye $c^8$. In Fig. 7 I have shown the lower end of the brake lever forked and provided with two eyes between which the opposite sides of section $d^4$ are inserted and locked in place by a bolt and nuts.

The mechanism herein illustrated and described is capable of considerable modification without departing from the principle of my invention.

Having described my invention what I claim is:

1. In an article of the character described, a brake lever, a brake block, and a brake shoe comprising a loop-shaped clamp having jaws to clamp the sides of the brake block and projections to support the end of the block, said brake shoe being pivotally secured to the brake lever and clamped upon the block by means of a threaded shank passed through both arms of the brake shoe in the rear of the block, and a clamping nut to lock the shoe in place and tension its pivotal movement.

2. In an article of the character described, a brake lever, a brake block, a loop-shaped brake shoe having clamping jaws at the free ends of said loop member to clamp the block, and means located intermediate of said jaws and the loop of said shoe to pivotally attach said brake shoe to the brake lever and to tension said pivotal movement.

3. In an article of the character described, a brake lever, a wooden brake block shaped to the arc of a circle at the front and rear faces and having beveled clamping faces at the rear edge, a loop-shaped brake shoe having clamping jaws at the free ends of said loop members to clamp the block, and means located intermediate of said jaws and the loop of said shoe to attach said shoe to the brake lever.

4. In an article of the character described, a brake lever, a wooden brake block shaped to the arc of a circle at the front and rear faces, having beveled faces at the rear edge and presenting the end grain of the wood to the wheel, a loop-shaped brake shoe having clamping jaws at its free ends to engage the clamping faces of the block substantially the full length of the block and projections to support one end of the block, and means to pivotally attach said brake lever to said shoe at a point intermediate of said jaws and the loop portion of said shoe, and to maintain a frictional tension between said shoe and lever to retain the shoe in position relative to said brake lever.

5. In an article of the character described a brake lever, a wooden brake block shaped to the arc of a circle at the front and rear edges, provided at the sides with curved beveled clamping faces, and presenting the end grain of the wood at the front and rear faces, a loop-shaped brake shoe having curved clamping jaws the counterpart of the clamping faces of said block, adapted to engage opposite sides of the block, and means to draw said clamping jaws upon the block, and to attach said brake shoe to the brake lever, with a yielding tension.

6. In an article of the character described, a brake lever, a brake block, a loop-shaped brake shoe having clamping jaws at the free ends of said shoe member to clamp upon the block, said brake lever being pivotally attached to said shoe intermediate of said jaws and the loop of said shoe, said shoe being held in position upon said brake lever and prevented from turning too freely by frictional engagement between said shoe and brake lever.

7. In an article of the character described, a brake lever, a brake block, a loop-shaped brake shoe having clamping jaws at the free ends of said shoe member to clamp upon the block, opposite arms of said shoe being pivotally attached to said brake lever at a point on said shoe intermediate of said jaws and the loop of said shoe, said shoe members being clamped to hold said block in place and said shoe in position relative to the brake lever by frictional engagement.

In testimony whereof I have affixed my signature in presence of two witnesses.

LEVI H. GOODWIN.

Witnesses:
C. W. MILES,
WALTER F. MURRAY.